United States Patent
Kelly et al.

(10) Patent No.: US 6,424,113 B1
(45) Date of Patent: Jul. 23, 2002

(54) METHOD AND APPARATUS FOR PULSE WIDTH MODULATION

(75) Inventors: John William Kelly, Dearborn; Michael W. Degner, Farmington Hills; Paul Theodore Momcllovich, Carleton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/756,410

(22) Filed: Jan. 6, 2001

(51) Int. Cl.⁷ .............................................. G05B 11/28
(52) U.S. Cl. ...................... 318/599; 388/804; 388/811; 388/819; 388/831
(58) Field of Search ..................... 318/599; 388/804, 388/811, 819, 831

(56) References Cited

U.S. PATENT DOCUMENTS

| | | | |
|---|---|---|---|
| 4,617,675 A | | 10/1986 | Ashikaga et al. |
| 4,875,448 A | * | 10/1989 | Dykrtra .................. 123/352 |
| 4,939,633 A | * | 7/1990 | Rhodes et al. ............... 363/98 |
| 5,121,043 A | * | 6/1992 | Kerkman et al. ............ 318/805 |
| 5,450,037 A | * | 9/1995 | Kamaya et al. ............. 330/297 |
| 5,614,803 A | * | 3/1997 | Morioka et al. ............. 318/801 |
| 5,648,705 A | * | 7/1997 | Sitar et al. .................. 318/145 |
| 5,650,708 A | * | 7/1997 | Sawada et al. ............. 318/801 |
| 5,699,240 A | | 12/1997 | Obayashi |
| 5,905,644 A | * | 5/1999 | Blasko et al. ................ 363/41 |
| 5,933,453 A | * | 8/1999 | Lewison ..................... 375/238 |
| 6,023,417 A | * | 2/2000 | Hava et al. .................... 363/41 |
| 6,043,624 A | | 3/2000 | Masaki et al. |

* cited by examiner

Primary Examiner—Robert E. Nappi
Assistant Examiner—Rina I. Duda
(74) Attorney, Agent, or Firm—Jennifer Stec

(57) ABSTRACT

A pulse width modulation circuit (10) for a motor controller is operated by generating an offset voltage and adding the offset voltage to a carrier timing signal to form an offset carrier timing signal. The operation of each of the phases of the motor is controlled as a function of the offset carrier signal.

15 Claims, 4 Drawing Sheets

METHOD AND APPARATUS FOR PULSE WIDTH MODULATION

TECHNICAL FIELD

The present invention relates generally to a method and apparatus for pulse width modulation, and more particularly, to a method and apparatus for pulse width modulation for an inverter circuit of a motor.

BACKGROUND

Most adjustable speed and torque drives are powered by an inverter. An inverter converts DC voltage or current to an AC waveform. The inverter consists of a DC source supplying voltage or current to a number of controllable switches. Pulse width modulation (PWM) is a method of controlling the inverter switching pattern to produce the desired amplitude and frequency of the output voltage or current. There are numerous forms of PWM. Sine-triangle PWM is one of the simplest to implement. In sine-triangle PWM a desired voltage waveform is compare to a triangle waveform, called the carrier signal. The pulse width is determined by the intersection of the two signals as shown in FIG. 1.

For a three-phase system, the maximum line-to-line voltage produced by Sine-Triangle PWM is 0.866 VDC or 86% of the DC supply. It has been shown that adding triplen harmonics to the phase voltage commands increases the line-to-line output voltage possible, without adding harmonic distortion to the machine.

The Space Vector PWM (SVPWM) is a PWM method that is equivalent to adding the triplen harmonics to the phase voltages. However, instead of phase voltages, the SVPWM method is based on a complex voltage vector or voltage space vector. A voltage space vector represents a voltage distributed sinusoidally in space. An inverter feeding a machine with three equally, sinusoidally distributed windings can produce six non-zero space vectors and two zero space vectors. Each vector has an associated switching state, with "−" representing an open inverter switch and "+" meaning the switch is closed. As shown in FIG. 2, the non-zero vectors form six sectors within a hexagon.

The first task in realizing a given voltage space vector, is to determine which sector the vector resides. In FIG. 3, the given space vector Ua is spatially located between the vectors of switching states {+−−} and {++−}. The space vector Ua can be represented by projections, Ua1 and USA, onto the two switching state vectors. However, to physically realize Ua, the inverter must divide the time spent in each switching state for a given time period. By toggling between states {−−−}, {+−−}, {++−}, and {+++} for specific time duration, an average value of Ua is produced.

In order to determine the appropriate time duration of each switching state, the projections of Ua onto those states must first be determined. The following equations determine the appropriate 5 switching duration for each switching state in a given time period of $T_s$.

$$t_{a1} = \frac{T_s}{2} U_a \frac{3}{\pi} \left( \cos(a) - \frac{1}{\sqrt{3}} \sin(a) \right)$$

$$t_{a2} = \frac{T_s}{2} U_a \frac{2\sqrt{3}}{\pi} \sin(a)$$

$$t_{a0} = \frac{T_s}{2} - t_{a1} - t_{a2}$$

Computationally, SVPWM method is more complex than the sine-triangle PWM method. However, the benefit of SVPWM is a greater potential output voltage. As shown in FIG. 4, the two circular trajectories inscribed in the hexagon represent the maximum peak voltage space vectors for the two PWM methods mentioned while in the linear modulation region. For sine-triangle PWM, the maximum fundamental peak phase voltage is equal to half of the DC bus voltage. The addition of the triplen harmonics in SVPWM, results in a greater maximum fundamental peak phase voltage of $V_{dc}/\sqrt{3}$. Due to the improved utilization of the DC voltage supply, the SVPWM method is the preferred PWM method, despite its computational complexity.

Recently, a method has been developed that eliminates the need for the trigonometric calculations in the SVPWM algorithm. In addition, this method simplifies the implementation of other forms of PWM such as 60° and 120° discontinuous, and allows for simplified overmodulation strategies. The method is based on the sine-triangle PWM, either discrete or analog, and realizes the other forms of PWM by adding an identical offset voltage (zero sequence voltage) to each of the phase voltage commands. An equivalent of SVPWM can be realized by using an offset voltage equal to the average of the maximum and minimum phase voltages as shown in FIG. 5. The addition of the offset centers the phase voltages between $+/-V_{dc}/2$. As a result, the phase voltages can be increased beyond the maximum magnitude possible when using the sine-triangle PWM alone. This method implicitly adds the triplen harmonics to the phase voltages by adjusting those voltages relative to the DC bus voltage limits.

The calculation of the offset voltage and its addition to the phase voltage commands can be easily implemented in a microprocessor, using only addition, multiplication, and compare instructions. For a three-phase system, a total of three add instructions are needed to shift the phase voltages. FIGS. 5a–6d shows examples of the offset voltage for SVPWM and three types of discontinuous PWM.

For a digital hardware implementation, the addition of the offset voltage to the phase voltage can be performed in either one of two ways. The digital hardware could have an arithmetic logic unit (ALU), which would sequentially add the offset to each of the reference voltages. However, the addition of an ALU to any hardware design adds complexity. Instead of an ALU, the addition of the offset to each of the phase voltages could be processed simultaneously. For every n phases, there would be n adder units 10 coupled to n comparator circuits 13, which adjust each phase voltage in parallel as shown in FIG. 7. An up/down counter 12 is coupled to a signal equal to the period divided by two. By counting the signal and coupling it to comparators 12, comparators 12 generate the desired pulses for each phase. The advantage of this parallel processing design is decreased computational time and a less complex, combinatorial design. The disadvantage of this implementation is the hardware cost of the n Full Adder units.

For a digital hardware implementation, the addition of the offset voltage to the phase voltage can be performed in either one of two ways. The digital hardware could have an arithmetic logic unit (ALU), which would sequentially add the offset to each of the reference voltages. However, the addition of an ALU to any hardware design adds complexity.

Instead of an ALU, the addition of the offset to each of the phase voltages could be processed simultaneously. For every n phases, there would be n adder units 10 coupled to n comparator circuits 13, which adjust each phase voltage in parallel as shown in FIG. 7. An up/down counter 12 is coupled to a signal equal to the period divided by two. By counting the signal and coupling it to comparators 12, comparators 12 generate the desired pulses for each phase. The advantage of this parallel processing design is decreased computational time and a less complex, combinatorial design. The disadvantage of this implementation is the hardware cost of the n Full Adder units.

It is desirable to reduce costs particularly in high volume automotive applications by reducing the amount of components when implemented in the hardware used for providing pulse width modulation for a motor. When implemented in software it is desirable to reduce the number of computational steps to improve the efficiency of the microprocessor.

It is therefore an object of the invention to improve the system efficiency of a pulse with modulating circuit.

SUMMARY OF THE INVENTION

In one aspect of the invention, a circuit for pulse width modulating a motor having n phase windings where n is greater than one includes an adder for adding a voltage offset signal and a carrier timing signal to form an offset carrier timing signal. A plurality of comparators equal to the number of phases are coupled to the adder and one of the n phase voltage signals. The n comparators form respective n output pulses corresponding to n phases in response to the offset carrier timing signal.

In another aspect of the invention, a method of providing pulse width modulation for a motor controller having n phase windings comprises the steps of:

generating a voltage offset;

adding the voltage offset to a carrier timing signal to form an offset carrier timing signal; and controlling the operation of each phase of the motor as a function of the offset carrier timing signal.

One advantage of the invention is that the present invention may be implemented in analog circuitry, digital circuitry, and in software. Another advantage of the invention is that nearly all known forms of pulse width modulation may be implemented easily using the same basic software or hardware.

Another advantage of the invention is that in a digital or analog hardware implementation, a significant reduction in hardware complexity and cost is achieved. The reduction in hardware complexity makes the pulse width modulation circuit more economically practical particularly in automotive applications. Another advantage of the invention is that the software implementation has a significant reduction in computational complexity. The reduction in computational complexity results in more efficient use of the microprocessor and potentially lower cost since a lower performance processor may be used.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
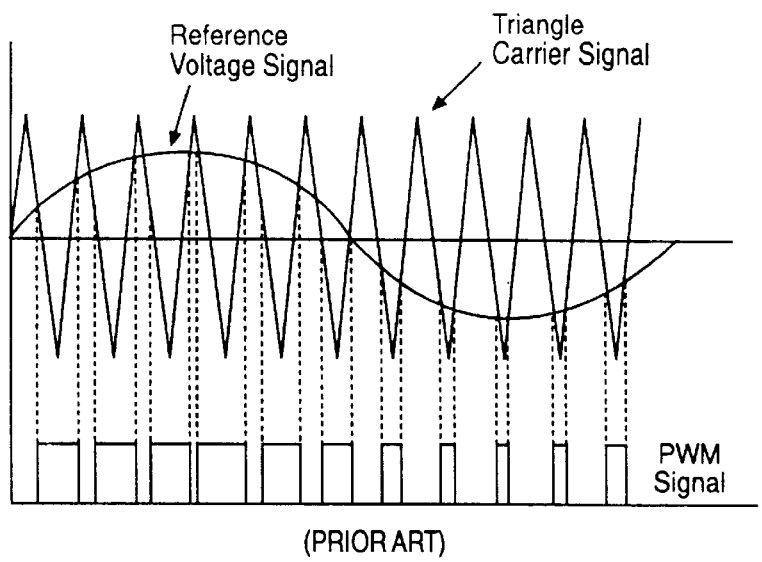
FIG. 1 is a plot of a pulse width modulation signal formed according to a sine-triangle pulse width modulation according to the prior art.
Figure 2:
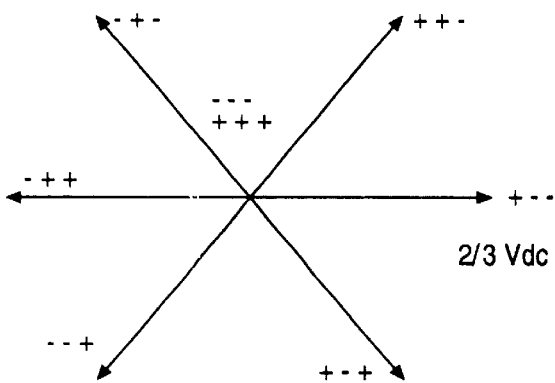
FIG. 2 is a plot of potential voltage vectors of an inverter corresponding to the inverter switching states according to the prior art.
Figure 3:
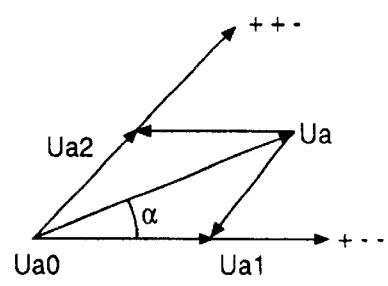
FIG. 3 is a vector plot of adjacent inverter voltage vectors according to the prior art.
Figure 4:
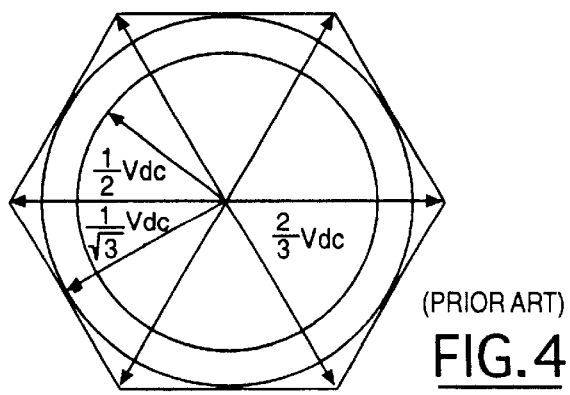
FIG. 4 is a maximum fundamental peak voltage plot illustrating two circular trajectories inscribed in a hexagon to represent the maximum peak voltage space vectors for two pulse width modulation methods according to the prior art.
Figure 5:
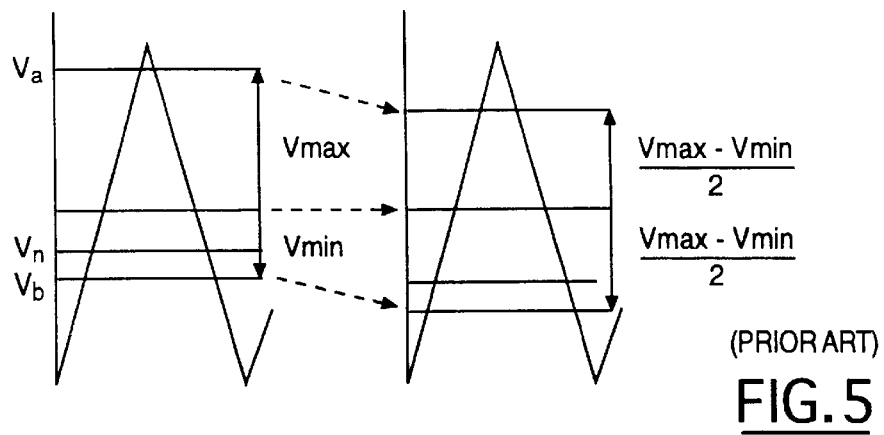
FIG. 5 is a plot of adjustment of phase voltage by adding an offset voltage resulting in space vector pulse width modulation according to the prior art.
Figure 7:
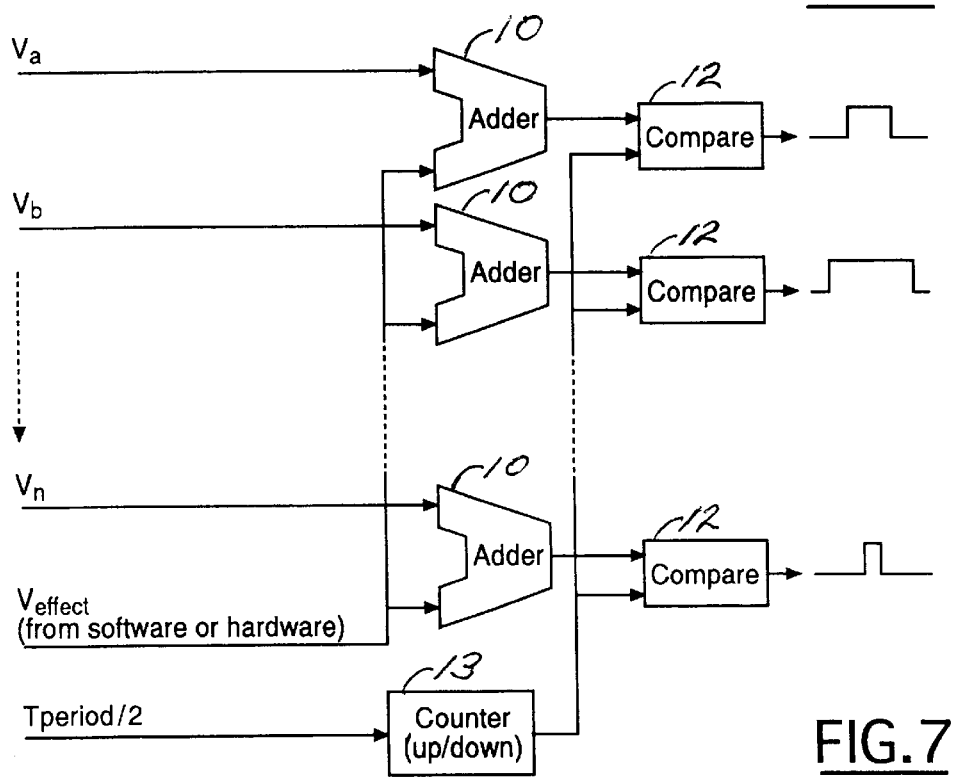
FIG. 7 is a schematic of a digital implementation of sine-triangle pulse width modulation width offset voltage addition according to the prior art.

In the following figures, the same reference numerals will be used to illustrate the same components in the various views. An implementation of the present invention in analog circuitry, and digital circuitry is illustrated. The steps of the present invention suitable for a software implementation are also described.

The present invention adds the offset voltage to the carrier waveform instead of adjusting each phase voltage command by the addition of an offset voltage as is described in the Background.

Figure 8:
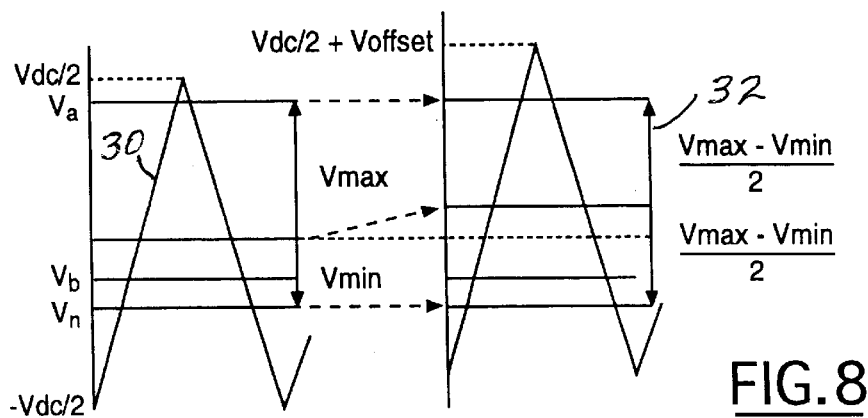
FIG. 8 is an adjustment of carrier signal by the offset voltage calculated for the implementation of space vector pulse width modulation according to the present invention.
Figure 6A:
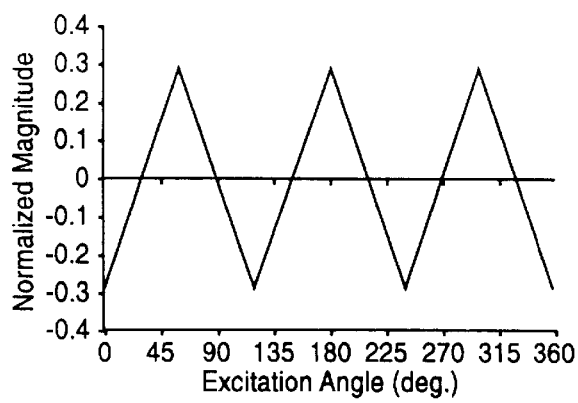
FIGS. 6a–6d illustrate four types of offset signals used for space vector pulse width modulation and three discontinuous types of PWM according to the prior art.
Figure 6B:
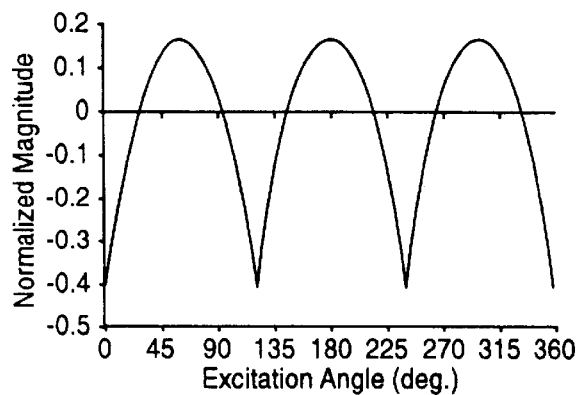
Figure 6C:
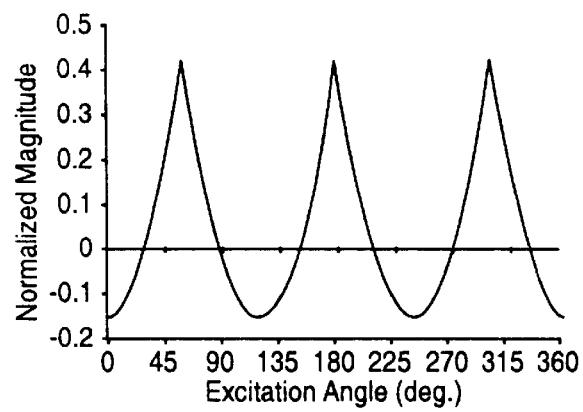
Figure 6D:
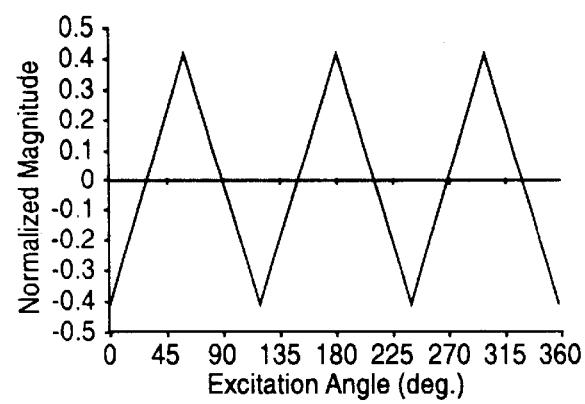

Referring now to FIG. 8, a plot illustrating a carrier signal 30 which is offset by an amount 32 corresponding to the offset voltage calculation for space vector pulse width modulation. As can be seen, the phase voltage signals $V_a$, $V_b$, and $V_c$ remain positioned relatively the same while the carrier signal is offset by the offset voltage 32. Each of the implementations illustrated below provide the same result. Thus, the maximum voltage point of the carrier signal is $V_{dc}/2 + V_{offset}$.

Figure 9:
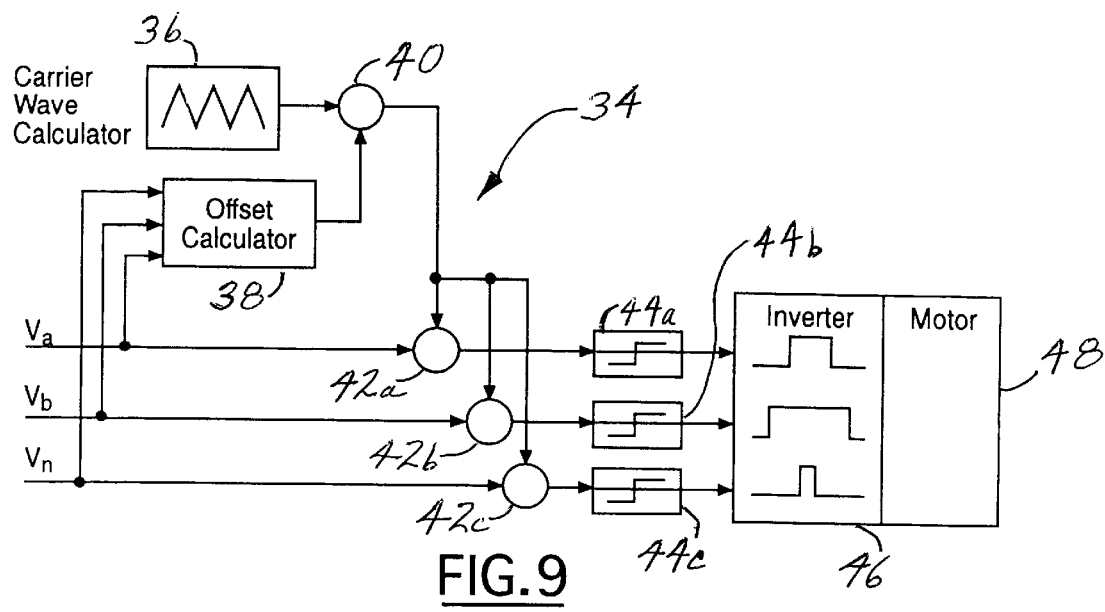
FIG. 9 is a schematic of an analog implementation of a pulse width modulation circuit according to the present invention.

Referring now to FIG. 9, an analog circuit 34 for implementing the present invention is illustrated. In this embodiment, a carrier wave calculator 36 is coupled to an offset calculator 38. The offset calculator 38 generates an offset signal which is coupled to the carrier wave signal generated by the carrier wave calculator 36. The carrier wave signal and the offset calculator signal are coupled to an adder 40 where they are added together to form an offset carrier wave signal. The offset carrier wave signal is supplied to each of the plurality of adders 42a, 42b, and 42c corresponding to the phase voltage signals $V_a$, $V_b$, and $V_c$. Thus, the adders 42a, 42b, and 42c add the offset carrier wave signal to the phase voltage signals.

A plurality of comparators 44a, 44b, and 44c receive the signal from adders 42a, 42b, and 42c. The comparators 44a–44c are coupled to the gate drive circuitry of inverter 46. The output of the comparators 44a–44c provide pulses to control the switching of inverter 46. Inverter 46 is coupled to a motor 48 in a conventional manner. Thus, each of the switches are controlled by the pulse widths generated by circuit 34.

Figure 10:
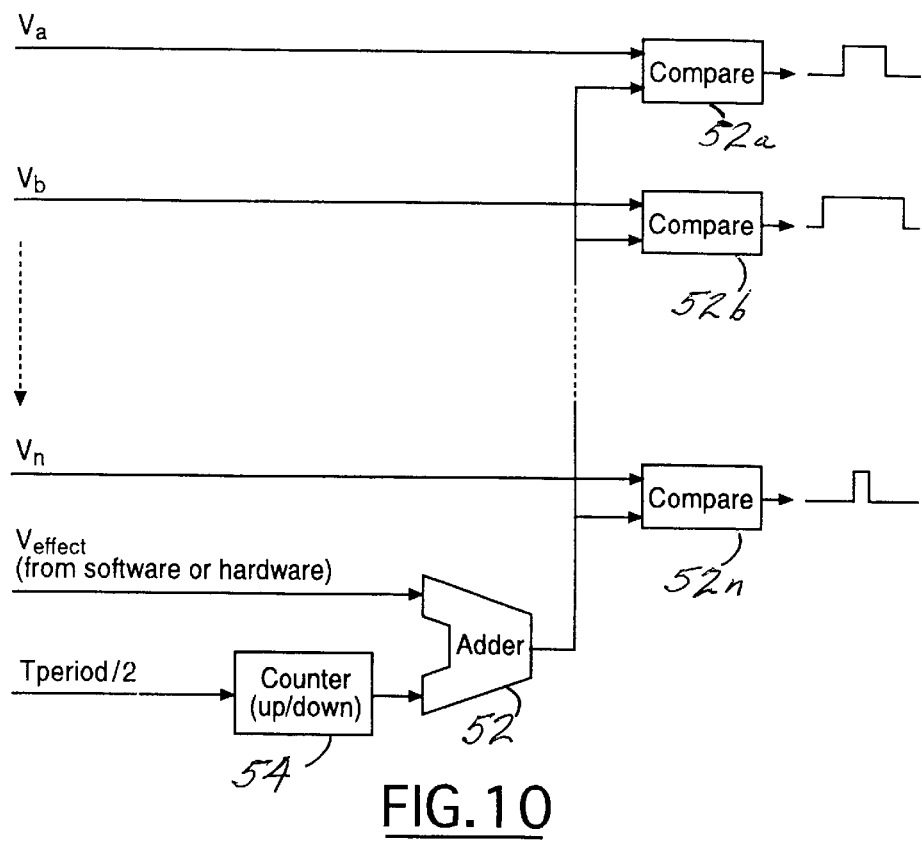
FIG. 10 is a schematic of an digital implementation of a pulse width modulation circuit according to the present invention.

Referring now to FIG. 10, a digital circuit 50 for implementing the present invention is illustrated. In this embodiment, an offset voltage $V_{offset}$ is coupled to an adder 52. Also, a signal equivalent to half the period (T/2) is coupled to an up/down counter 54 which has a signal which is coupled to adder 52. The output of counter 54 is the carrier signal which is added to the voltage offset at adder 52 to provide the offset carrier signal. The offset carrier signal is coupled to a plurality of comparators 52a, 52b, and 52n, where n is the number of phase voltage signals. In this embodiment, each of the outputs of comparators 52a–52n produce a pulse width that is coupled to the inverter 46 and motor 48 in a similar manner to that illustrated in FIG. 9.

In operation, the voltage offset combined with the type of carrier signal used will determine the type of pulse width modulation used. The present invention may accommodate various types of pulse width modulation including space vector pulse width modulation, discontinuous pulse width modulation, and sine-triangle modulation.

To obtain the various types of PWM such as those described in the Background, the various offset signals are modified. Various types of offset signals suitable for the present invention are illustrated in FIG. 6.

When implemented in digital hardware, a reduction in complexity and costs is achieved by reducing the number of adders. The digital design may be integrated into a motor control processor chip such as a digital signal processor or microcontroller. The design may also be incorporated into an application specific integrated circuit (ASIC). The stand alone device may receive voltage commands from a variety of sources including general microprocessors or digital signal microprocessors depending on performance needs. In addition to implementing the actual pulse width modulation in hardware, the offset voltage calculation could also be implemented in hardware, further reducing the load on the microcontroller processor. When implemented in software, the present invention reduces the number of lines of codes which increases the operational efficiency of the device. When used in a greater than three-phase system, the present invention results in almost no increase in hardware complexity due to the additional phases.

While particular embodiments of the invention have been shown and described, numerous variations and alternate embodiments will occur to those skilled in the art. Accordingly, it is intended that the invention be limited only in terms of the appended claims.

What is claimed is:

1. A method of providing pulse width modulation for a motor controller having n phase windings comprises the steps of:
   generating a voltage offset;
   adding the voltage offset to a carrier timing signal to form an offset carrier timing signal;
   controlling the operation of each phase of the motor as a function of the offset carrier timing signal; and
   comparing the offset carrier timing signal to a winding control signal to form an output pulse for each of the n phases.

2. A method as recited in claim 1, wherein the step of controlling comprises the step of generating a plurality of pulses in response to the offset carrier timing signal.

3. A method as recited in claim 1, wherein the step of controlling comprises the steps of
   comparing the offset carrier timing signal to a phase voltage for each of the n phase windings;
   generating an output pulse for each of the n phases in response to the step of comparing.

4. A method as recited in claim 1, wherein the step of controlling comprises the steps of adding the offset carrier timing signal to a phase voltage for each of the n phase windings to form a pulse signal.

5. A method as recited in claim 1, wherein prior to the step of adding comprises the step of dividing a period of the carrier signal period by 2 and counting the period divided by 2.

6. A system for providing pulse width modulation comprising:
   a controller program to perform the steps of, generating a voltage offset;
   adding the voltage offset to a carrier timing signal to form an offset carrier timing signal;
   controlling the operation of each phase of the motor as a function of the offset carrier timing signal; and
   comparing the offset carrier timing signal to a winding control signal to form an output pulse for each of the n phases.

7. A system as recited in claim 6, wherein the step of controlling comprises the step of generating a plurality of pulses in response to the offset carrier timing signal.

8. A system as recited in claim 6, wherein the step of controlling comprises the steps of:
   comparing the offset carrier timing signal to a phase voltage for each of the n phase windings; generating an output pulse for each of the n phases in response to the step of comparing.

9. A system as recited in claim 6, wherein the step of controlling comprises the steps of adding the offset carrier timing signal to a phase voltage for each of the n phase windings to form a pulse signal.

10. A system as recited in claim 6, herein prior to the step of adding comprises the step of dividing a period of the carrier signal period by 2 and counting the period divided by 2.

11. A pulse width modulation circuit for a motor having n windings where n is greater than one, comprising:
   an adder for adding a voltage offset signal and a carrier timing signal to form an offset carrier timing signal;
   n comparators each of said comparators coupled to said adder and one of said n winding signals, said comparators forming respective n output pulses corresponding to n windings in response to said offset carrier timing signal, said comparators further comparing the offset carrier timing signal to a winding control signal to form an output pulse for each of the n phases.

12. A circuit as recited in claim 11, wherein said n comparators generate sine-triangle pulse width modulation.

13. A circuit as recited in claim 11, wherein said n comparators generate space vector pulse width modulation.

14. A circuit as recited in claim 11, wherein said n comparators generate discontinuous pulse width modulation.

15. A circuit for providing pulse width modulation for a motor comprising:

a carrier wave calculator generating a carrier wave signal;

an offset calculator generating an offset signal;

a first adder adding the carrier wave signal to the offset signal to form an offset carrier timing signal;

a second adder adding the carrier timing signal to a first phase voltage signal to form a first pulse signal;

a third adder adding the carrier timing signal to a second phase voltage signal to form a second pulse signal;

a fourth adder adding the carrier timing signal to a third phase voltage signal to form a third pulse signal;

a fifth adder adding the carrier timing signal to a fourth phase voltage signal to form a fourth pulse signal; and:

an comparator receiving the first pulse signal, the second pulse signal and third pulse signal for controlling the operation of the motor in response to said first pulse signal, said second pulse signals and said third pulse signals.

\* \* \* \* \*